Figure 1:
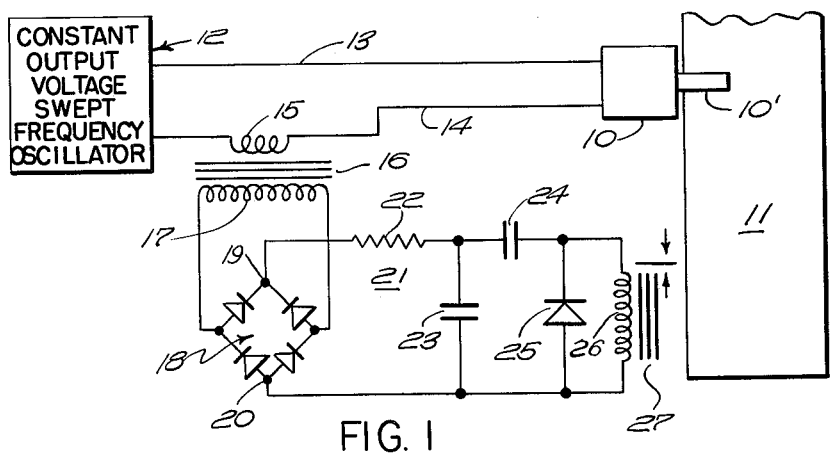

Aug. 21, 1962          S. R. RICH          3,050,720

SYSTEM FOR SENSING A CHANGE IN AN AMBIENT CONDITION

Filed Dec. 17, 1958

INVENTOR.
STANLEY R. RICH
BY Alfred H. Rosen
ATTORNEY

3,050,720
SYSTEM FOR SENSING A CHANGE IN AN AMBIENT CONDITION
Stanley R. Rich, West Hartford, Conn., assignor to General Ultrasonics Company, Hartford, Conn., a corporation of Connecticut
Filed Dec. 17, 1958, Ser. No. 781,119
19 Claims. (Cl. 340—244)

This invention relates in general to condition sensing systems, and more particularly to systems which sense a change in a specific ambient condition of an environment.

Ambient condition sensors are known in which a sensing device such as an electromechanical transducer, which is driven for example in series resonance by an oscillating circuit, is placed in a region of which the ambient conditions are desired to be supervised, and a change in impedance of the transducer from the loaded condition to a comparatively unloaded condition is employed to produce an indication of a change in an ambient condition of the environment of a portion of the transducer. For example an electromechanical transducer arranged to introduce elastic waves into air or other gas will be relatively unloaded as compared with the same electromechanical transducer when introducing elastic waves into water or other liquid. Its impedance to a driving signal will change somewhat as the environment is changed, from liquid to gas, for example, or vice versa. Thus a system including means for driving an electromechanical transducer element can be used to supervise the level of a liquid in a container, and to control a predetermined response to a specified change in the liquid level. My present invention is directed to improvements in all such systems for the sensing of changes in ambient conditions.

Heretofore such systems have customarily employed driving signals of a frequency chosen to drive the transducer in resonance, it being believed that by so doing the transducer would be driven at maximum amplitude and therefore the system would be operated at its greatest efficiency. I have observed that an electromechanical transducer which is driven somewhat off resonance, rather than in series resonance, for example, with a driving source, will undergo a much greater change in impedance when immersed in liquid as compared with gas than the change which exists when the transducer is driven exactly in resonance. It is an object of my invention to employ this larger change in impedance as an indication of a change in the ambient medium, for example from gas to liquid or vice versa. It is a further object of my invention to employ this larger change in such a manner that no critical tuning of the entire system is necessary, while assuring at all times that the maximum change in impedance, upon change in the supervised ambient condition, will always be available to indicate the change in condition. A further object of my invention is the provision of such a system which is simple to operate and in fact will operate automatically once placed in an operating condition. Additional objects of the invention are simplicity of design, ruggedness of components, and extreme reliability under all conditions of temperature, pressure, motion, acceleration, and various other stresses which may be available in all conceivable environments in which modern electric equipment is called upon to operate, including military environments of the most advanced kinds.

It is generally proposed according to the invention to provide, for driving a transducer, a swept-frequency driver, the frequency of which is swept through a band which includes both the series and anti-resonant frequencies of the transducer, and to indicate, by observation of the resulting modulation envelope of the signal provided to the transducer, changes in the modulation envelope which are caused by a change in the supervised ambient condition. This is done automatically by providing that the driving energy signal, and hence the modulation envelope, will contain in it a band of frequencies which includes both the transducer series and anti-resonant frequencies, and frequencies far enough to each side of them to include that region at which the change in transducer impedance is greatest as the condition which is being supervised is changed. The provision of means for observing the modulation envelope then provides a positive and maximum indication of the condition which is being supervised as it changes. More generally speaking, my invention envisions the employment of a sensing element which is mechanically resonant at a given frequency and a driving source which drives the element at a plurality of frequencies including the frequency of resonance, in combination with means to indicate that portion of the modulation envelope at which the sensing device goes through its maximum change in impedance as the load upon it is changed from one character to another.

Figure 2:
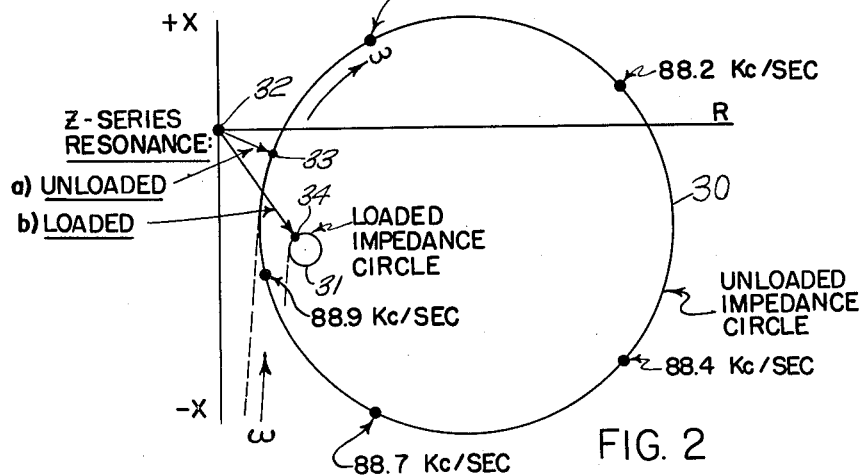
Figure 3:
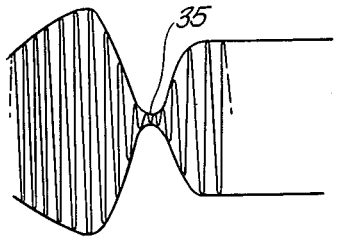
Figure 4:
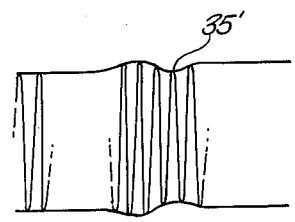
Figure 5:
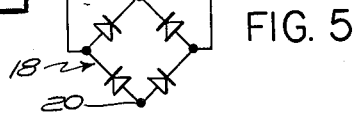

The foregoing and other objects and features of my invention will become more apparent from the following description of an embodiment thereof. The description refers to the accompanying drawing wherein FIG. 1 illustrates a circuit in accordance with the invention;

FIG. 2 illustrates a motional impedance diagram which is useful to explain the operation of the invention;

FIG. 3 indicates a modulation envelope of current in the unloaded transducer of FIG. 1;

FIG. 4 indicates the modulation envelope of current in the loaded transducer of FIG. 1; and FIG. 5 illustrates another circuit in accordance with the invention.

Referring now to FIG. 1, a sensing device 10, which may be an electromechanical transducer of any known kind, is located in a wall of a container 11, which may be a tank, and is connected electrically to a constant output voltage swept-frequency oscillator 12 via wires 13 and 14. Connected in series in one of these wires is the primary winding 15 of a current transformer 16. The secondary winding 17 of the transformer is connected across the input of an averaging rectifier 18, which is an envelope detector, the output of which is connected at terminals 19 and 20 to an output circuit 21. The output circuit includes a low pass filter comprising a series resistor 22 and a shunt capacitor 23, and an envelope peak detector comprising a series capacitor 24 and a rectifier 25. The coil 26 of an output relay 27 is connected in shunt with the rectifier 25.

Referring now to FIG. 2, a typical motional impedance diagram of an electromechanical transducer is shown, in both the loaded and unloaded conditions. The larger circle 30 applies to the unloaded condition—namely the condition when the sensing end 10' of the sensing device 10 is in contact, let us say, with air or other gas. The smaller circle 31 shows the impedance of the sensing device when the sensing end 10' is in contact with a liquid medium. The horizontal axis represents resistance R and the vertical axis from minus X to plus X represents reactance, as is well known. Points along each of the motional impedance circle itself can be described as a locus of complex impedance as the driving frequency is shifted.

The large circle 30 has a very large diameter compared with the small circle 31. In actual practice the ratio of diameters of the two circles is in a practical case which I have measured on the order of 100 to 1. This is a vast difference, as compared with the ratio of the loaded impedance of the transducer to its unloaded impedance, at series resonance. The series resonance impedance of the transducer in the unloaded and the loaded conditions are shown by the arrows drawn from the origin 32 in FIG. 2 to points 33 and 34, respectively; these are not very different in length as compared with the distances from the origin 32 to points diametrically opposite points 33 and 34 on the large circle and on the small circle, respectively.

In prior existing sensing devices, and their accompanying computer circuits, the transducer impedance at the origins of the circles is used with a fixed frequency oscillator, driving the transducer in series resonance, to determine the presence or absence of liquids, for example. More specifically, the sensing device is usually so coupled to an oscillator that the oscillator is or is not in oscillation when the sensing device is or is not in contact with a liquid as compared with a gas. The change in impedance, at this point in the motional impedance loops, from loaded to unloaded condition, is of the order of 4 to 1, in liquid oxygen, for example. In this same environment the diameters of the motional impedance circle as the driving frequency changes have a ratio of between 50 and 100 to 1. The embodiment shown in FIG. 1 utilizes this fact, instead of the much smaller relative change from origin of circle to origin of graph, in order to produce much greater sensitivity to a change in environmental ambient condition. In addition the embodiment of FIG. 1 uses the entire motional impedance circle rather than a single point on it, thus providing an immunity to resonant frequency changes in the sensing device, whether due to temperature, pressure, motion, acceleration, or any other condition or conditions of either transducer or computer.

Referring again to FIG. 1, if the sensing device 10 is driven via the constant output voltage swept-frequency oscillator 12 between the frequency limits, let us say 80 kc./sec. to 95 kc./sec., then the current input to the sensing device will vary as the transducer impedance is thereby swept around the motional impedance circle. In the case of the unloaded transducer, that is, sensing device 10, with its sensing end 10' in air or other gas, an enormous change in impedance of the sensing device is experienced as frequency is swept around the motional impedance loop. The current transformer 16 in series with the sensing device develops a voltage change of the order of several hundred to one across the secondary winding 17, as the driving frequency sweeps around the loop in the unloaded condition. In the loaded condition the same sensing device will experience a current change of only approximately 4 to 1. The actual output from the current transformer is generally as shown in FIGS. 3 and 4.

Referring to FIG. 3, the modulation envelope of current in the unloaded transducer 10 over the band of frequencies at which the transducer is driven will show a very large dip 35 in the presence of the unloaded motional impedance circle, representing almost 100% downward modulation. The corresponding envelope in FIG. 4, which is obtained with the transducer 10 in a loaded condition, will show only a very small decrease 35' by comparison.

Referring again to FIG. 1, the averaging rectifier 18 is employed to rectify the voltage output from the current transformer 16. This is an averaging rectifier, not a peak rectifier, since it is desired to retain the modulation information. The output from the averaging rectifier will then have a very large pulse 35 (FIG. 3) in it in the absence of liquid (the unloaded condition) at the sensing end 10' of the transducer 10, and only a very small pulse 35' (FIG. 4) in the loaded condition, when liquid contacts the sensing device at the end 10' thereof.

When the frequency at which the swept frequency oscillator 12 is operated is swept through its operating range (from 80 to 95 kc./sec.) the precise resonant frequency of the transducer 10 becomes unimportant, since the pulse 35 will appear somewhere between these two frequency limits, assuming only that these are the logical limits within which the transducer 10 resonance frequency will vary over a given range of temperatures or other conditions tending to alter its resonance frequency. This is a condition which is easily adjusted. The pulse 35 can be used to close a relay 27 by the use of the additional peak rectifier 25—26, which will distinguish the presence of a pulse. Alternatively the same peak voltage, obtained by a peak rectifier, can be used to bias a transistor, for example, to turn a relay either on or off.

In FIG. 5 a constant output current swept frequency oscillator 42 is employed to drive the transducer 10, and the averaging rectifier 18 is connected directly across the wires 13 and 14 between the oscillator and the transducer. FIG. 5 is otherwise the same as FIG. 1; the output circuit 21 is not illustrated to avoid needless repetition.

A "constant output current" oscillator is, in the present context, an oscillator of which the internal impedance is high with respect to that of the load (transducer 10). Under this condition, the voltage across the transducer 10 varies with the impedance of the transducer, so that curves like those of FIGS. 3 and 4 represent envelopes of voltage change across the transducer, instead of current change in it, with respect to the unloaded and loaded conditions, respectively.

It will be recognized that FIGS. 1 and 5 represent two idealized extremes. Practical configurations will exist having characteristics falling somewhere between the characteristics of these two embodiments of the invention.

The embodiments herein described and illustrated are by way of example only, and are not intended to be limiting upon my invention, or upon the claims which follow. Those skilled in the art will appreciate many other environments in which the invention can be employed in many other arrangements employing the invention, including but not limited to arrangements in which a plurality of sensing devices can be operated simultaneously from a single circuit, and arrangements in which other modes of driving the sensing device, and other modes of utilizing its information, are employed.

What I claim is:

1. A system for sensing a change in an ambient condition comprising an electro-mechanical sensing device having a natural frequency of resonance, means providing alternating electric energy for driving said device, means for progressively altering the frequency of said energy through a band which includes said frequency of resonance and another frequency at which a change in the acoustic loading of said device causes a substantially greater change in the impedance of said device to driving alternating energy than the same change in acoustic loading causes at said frequency of resonance, means for sensing a change in the impedance of said device with respect to frequency and with respect to the ambient medium said sensing means including means to detect the modulation envelope of the alternating current supplied to said device with respect to frequency over said band, and means for indicating a change in said envelope resulting from a change in said impedance caused by a change in the ambient condition.

2. A condition sensor comprising an electromechanical transducer resonant at a particular frequency, a substantially constant output voltage swept-frequency oscillator adapted to provide an alternating signal variable in frequency over a band between limits including said particular frequency and another frequency at which a change in the acoustic loading of said transducer causes a substantially greater change in the impedance of said transducer to said signal than the same change in acoustic loading causes at said particular frequency, a current transformer coupled at its primary winding in series with said oscillator and said transducer, an averaging rectifier coupled to the secondary winding of said transformer adapted to detect the modulation envelope of the alternating current supplied to said transducer with respect to frequency over said band, and an envelope peak detector in the output of said averaging rectifier.

3. A condition sensor comprising an electromechanical transducer resonant at a particular frequency, a substantially constant output current swept-frequency oscillator adapted to provide an alternating signal varying in frequency over a band between limits including said particular frequency and another frequency at which a change in the acoustic loading of said transducer causes a substantially greater change in the impedance of said transducer to said signal than the same change in acoustic loading causes at said particular frequency connected across said transducer, an averaging rectifier coupled to said transducer adapted to detect the modulation envelope of the alternating current supplied to said transducer with respect to frequency over said band, and an envelope peak detector in the output of said averaging rectifier.

4. An ambient condition sensing system comprising an electromechanical transducer, means to drive said transducer with a substantially constant voltage signal swept in frequency over a band between limits which include the resonant frequency of said transducer and another frequency at which a change in the acoustic loading of said transducer causes a substantially greater change in the impedance of said transducer to said signal than the same change in acoustic loading causes at said resonant frequency, and means to generate a signal which is responsive to the envelope of the current input to said transducer with respect to frequency over said band.

5. An ambient condition sensing system comprising an electromechanical transducer, means to drive said transducer with a substantially constant current signal swept in frequency over a band between limits which include the resonant frequency of said transducer and another frequency at which a change in the acoustic loading of said transducer causes a substantially greater change in the impedance of said transducer to said signal than the same change in acoustic loading causes at said resonant frequency, and means to generate a signal which is responsive to the envelope of the voltage input to said transducer with respect to frequency over said band.

6. A condition sensing system comprising a sensing transducer which is mechanically resonant at a given frequency, means to apply alternating electric energy to said transducer in a band of frequencies including said given frequency and another frequency at which a change in the acoustic loading of said transducer causes a substantially greater change in the impedance of said transducer to said energy than the same change in acoustic loading causes at said given frequency, said means being adapted to sweep through said band periodically, and envelope detector means to generate a signal proportional to the impedance of said transducer throughout said band.

7. A condition sensing system comprising a transducer which is mechanically resonant at a given frequency, means to apply alternating electric energy to said transducer in a band of frequencies including said given frequency and another frequency at which a change in the acoustic loading of said transducer causes a substantially greater change in the impedance of said transducer to said energy than the same change in acoustic loading causes at said given frequency, said means being adapted to sweep through said band periodically, averaging rectifier means adapted to detect the modulation envelope of current supplied to said transducer with respect to frequency over said band, and peak voltage rectifier means connected to the output of said averaging rectifier means to generate a signal proportional to a change in the impedance of said transducer.

8. Apparatus for supervising a change in an ambient condition comprising an electromechanical transducer which is mechanically resonant at a first frequency, means to apply to said transducer a driving voltage progressively changing in frequency through a band including said first frequency and another frequency at which a change in the acoustic loading of said transducer causes a substantially greater change in impedance of said transducer to the driving voltage than the same change in acoustic loading causes at said first frequency, means in circuit with said transducer to generate a signal proportional to the impedance of said transducer presented to said driving voltage throughout said band, and operator means connected in the output of said signal generating means and responsive to a change in said signal.

9. Apparatus for supervising a change in an ambient condition comprising an electromechanical transducer having an electrical element and a mechanical element which is mechanically resonant at a first frequency, means in circuit with the electrical element of said transducer to apply thereto a driving voltage progressively changing in frequency through a band including said first frequency and another frequency at which a change in the acoustic loading of said transducer causes a substantially greater change in impedance of said transducer to the driving voltage than the same change in acoustic loading causes at said first frequency, means in series with said voltage applying means and said electrical element to generate a signal proportional to the impedance of said transducer presented to said driving voltage throughout said band, and operator means connected in the output of said signal generating means and responsive to a change in said signal.

10. Apparatus for supervising a change in an ambient condition comprising an electromechanical transducer which is mechanically resonant at a first frequency, means to apply to said transducer a driving voltage progressively changing in frequency through a band including said first frequency and another frequency at which a change in the acoustic loading of said transducer causes a substantially greater change in the impedance of said transducer to the driving voltage than the same change in acoustic loading causes at said first frequency, means in circuit with said transducer to generate a signal proportional to the impedance of said transducer presented to said driving voltage throughout said band, means connected in the output of said signal generating means to peak rectify a change in said signal, and operator means responsive to the output of said rectifying means.

11. Apparatus for supervising a change in an ambient condition comprising an electromechanical transducer having an electrical element and a mechanical element which is mechanically resonant at a first frequency, means in circuit with the electrical element of said transducer to apply thereto a driving voltage at substantially constant current progressively changing in frequency through a band including said first frequency and another frequency at which a change in the acoustic loading of said transducer causes a substantially greater change in impedance of said transducer to the driving voltage than the said change in acoustic loading causes at said first frequency, means in parallel with said electrical element to detect the modulation envelope of said current throughout said band, and operator means responsive to a change in said envelope.

12. Apparatus for supervising a change in an ambient condition comprising an electromechanical transducer having an electrical element and a mechanical element which is mechanically resonant at a first frequency, means in circuit with the electrical element of said transducer to apply thereto a substantially constant driving voltage progressively changing in frequency through a band including said first frequency and another frequency at which a change in the acoustic loading of said transducer causes a substantially greater change in impedance of said transducer to the driving voltage than the same change in acoustic loading causes at said first frequency, means in series with said voltage applying means and said electrical element to detect the modulation envelope of current in said transducer throughout said band, and operator means responsive to a change in said envelope.

13. Apparatus for supervising a change in an ambient condition comprising an electromechanical transducer having an electrical element and a mechanical element which is mechanically resonant at a first frequency, means in circuit with the electrical element of said transducer to apply thereto a driving voltage at substantially constant current progressively changing in frequency through a band including said first frequency and another frequency at which a change in the acoustic loading of said transducer causes a substantially greater chaneg in impedance of said transducer to the driving voltage than the same change in acoustic loading causes at said first frequency, means in parallel with said electrical element to detect the modulation of said current throughout said band, means connected in the output of said detecting means to peak rectify a change in said envelope, and operator means responsive to the output of said rectifying means.

14. Apparatus for supervising a change in an ambient condition comprising an electromechanical transducer having an electrical element and a mechanical element which is mechanically resonant at a first frequency, means in circuit with the electrical element of said transducer to apply thereto a substantially constant driving voltage progressively changing in frequency through a band including said first frequency and another frequency at which a change in the acoustic loading of said transducer causes a substantially greater change in impedance of said transducer to the driving voltage than the same change in acoustic loading causes at said first frequency, means in series with said voltage applying means and said electrical element to detect the envelope of current in said transducer throughout said band, means connected in the output of said detecting means to peak rectify a change in said envelope, and operator means responsive to the output of said rectifying means.

15. A condition sensing system comprising a sensing element having a prescribed frequency of series electrical resonance, means to drive said element at a frequency other than said series resonance frequency at which said sensing element goes through its maximum change in impedance to said driving means as the acoustic load upon it is changed from one character to another, and operator means responsive substantially only to said maximum change.

16. A condition supervising system comprising a sensing element having a prescribed frequency of series electrical resonance, means to drive said element with an electrical signal progressively varying in frequency through a band including said frequency of resonance and another frequency at which a change in the acoustic loading of said element causes a substantially greater change in the impedance of said element to said signal than the same change in acoustic loading causes at said prescribed frequency, and means to indicate that portion of the modulation envelope of the driving signal current at which the sensing element goes through its maximum change in impedance as the acoustic load upon it is changed from one character to another.

17. A system for sensing a change in an ambient condition comprising an electromechanical sensing device having a natural frequency of resonance, means providing alternating electric energy for driving said device, means for progressively altering the frequency of said energy through a band which includes said frequency of resonance, first rectifier means adapted to detect the modulation envelope of the alternating current supplied to said device with respect to frequency over said band, and second rectifier means adapted for indicating a change in said envelope resulting from a change in the impedance of said device to the driving alternating electric energy caused by a change in the acoustic loading of said device.

18. A system for sensing a change in an ambient condition comprising an electromechanical sensing device having a natural frequency of resonance, means providing alternating electric energy for driving said device, means for progressively altering the frequency of said energy through a band which includes said frequency of resonance and a second frequency which is susbtantially diametrically opposite said frequency of resonance on the motional impedance loop for said sensing device under similar load conditions, means to detect the modulation envelope of the alternating current supplied to said device with respect to frequency over said band, and means for indicating a change in said envelope resulting from a change in the impedance of said device to the driving alternating electric energy caused by a change in the acoustic loading of said device.

19. A system for sensing a change from one to the other of a liquid and a gas in a region, comprising an electromechanical vibrator having a natural frequency of mechanical resonance adapted to be disposed in said region, means providing alternating electric energy for driving said vibrator, means for progressively altering the frequency of said energy through a band which includes said frequency of resonance and another frequency at which a change in the acoustic loading of said vibrator between a liquid and a gas causes a substantially greater change in the impedance of said vibrator to driving alternating energy than the same change in acoustic loading causes at said frequency of resonance, means for sensing a change in the impedance of said vibrator with respect to frequency and with respect to the acoustic load on said vibrator, said sensing means including means to detect the modulation envelope of the alternating energy supplied to said vibrator with respect to frequency over said band and means for indicating a change in said envelope resulting from a change in said impedance caused by a change in said acoustic load.

References Cited in the file of this patent

UNITED STATES PATENTS

| | | |
|---|---|---|
| 2,431,234 | Rassweiler et al. | Nov. 18, 1947 |
| 2,530,619 | Kliever | Nov. 21, 1950 |
| 2,621,517 | Sontheimer | Dec. 16, 1952 |
| 2,661,714 | Greenwood et al. | Dec. 8, 1953 |
| 2,682,767 | Henry | July 6, 1954 |
| 2,774,959 | Edelman et al. | Dec. 18, 1956 |